United States Patent [19]

Mir

[11] Patent Number: 4,707,081

[45] Date of Patent: Nov. 17, 1987

[54] LINEAR LIGHT VALVE ARRAYS HAVING TRANSVERSELY DRIVEN ELECTRO-OPTIC GATES AND METHOD OF MAKING SUCH ARRAYS

[75] Inventor: Jose M. Mir, Rochester, N.Y.

[73] Assignee: Eastman Kodak Company, Rochester, N.Y.

[21] Appl. No.: 780,873

[22] Filed: Sep. 27, 1985

[51] Int. Cl.⁴ .......................... G02F 1/03; H05K 3/04
[52] U.S. Cl. ..................... 350/388; 24/847; 350/392
[58] Field of Search .............. 350/320, 356, 392, 388; 29/576 W, 847

[56] References Cited

U.S. PATENT DOCUMENTS

| | | | |
|---|---|---|---|
| 3,862,795 | 1/1975 | Tellerman | 350/392 |
| 3,873,187 | 3/1975 | Brooks | 350/356 |
| 4,289,384 | 9/1981 | Samek | 350/392 |
| 4,491,393 | 1/1985 | Roelants | 350/392 |
| 4,569,573 | 2/1986 | Agostinelli | 350/356 |

FOREIGN PATENT DOCUMENTS

| | | | |
|---|---|---|---|
| 3138340 | 4/1983 | Fed. Rep. of Germany | 29/576 W |
| 19919 | 2/1984 | Japan | 350/356 |
| 158417 | 8/1985 | Japan | 350/356 |

OTHER PUBLICATIONS

IEEE Transactions of Computers, vol. C-24, No. 4, Apr. 1975, (See FIG. 2), Butter et al, pp. 402-406.

*Primary Examiner*—William H. Punter
*Attorney, Agent, or Firm*—John D. Husser

[57] ABSTRACT

A linear light valve array having transversely driven, discretely addressable, electro-optic gates which selectively change the polarization of incident light is disclosed. The array has a plurality of spaced gates. Each gate includes a planar light receiving top surface which receives incident polarized light, and first and second spaced parallel electrode receiving surfaces that are arranged substantially normal to the top receiving surface. Discretely addressable electrodes are formed on such receiving surfaces. In response to an applied voltage, the electrodes of a gate establish a transverse electric field which changes the plane of polarization of light passing through the gate and substrate. In another aspect of this invention, a method of making such a linear light valve array is disclosed. In accordance with this method, a strip of photoresist material is formed on a wafer of electro-optic material. Grooves are then cut in the wafer on each side of the strip. A conductive layer is formed on the top surface of the wafer in the grooves and on the strip. The photoresist and its overlying conductive layer are removed. A plurality of evenly spaced parallel grooves are then cut in the wafer to define the gates.

5 Claims, 8 Drawing Figures

LINEAR LIGHT VALVE ARRAYS HAVING TRANSVERSELY DRIVEN ELECTRO-OPTIC GATES AND METHOD OF MAKING SUCH ARRAYS

BACKGROUND OF THE INVENTION

1. Field of the Invention

The present invention relates to linear light valve arrays having transversely driven electro-optic gates and to a method of making such arrays.

2. Description of the Prior Art

One form of light valve comprises a gate that is electrically addressable for changing the polarization of light. The gate is sandwiched between a polarizer and a crossed analyzer. The gate generally is made of a sheet of transparent material exhibiting an electro-optic effect. Such a material is lanthanum doped lead zirconate titanate (PLZT), on which is provided a pair of electrodes for establishing an electric field in the material to stimulate the electro-optic effect.

In many applications, an array of light valves is needed. In one such light valve array, a sheet of PLZT material has a plurality of coplanar interleaved electrodes formed on one surface of the sheet generally normal to incident plane polarized light, thereby defining a plurality of light valve gates on the sheet. The selective application of voltages to adjacent electrodes establishes an electric field in the PLZT material. This field has a component generally perpendicular to the direction of incident light. The incident light is typically polarized at a 45° angle with respect to some component of the applied field. The electric field causes the PLZT material to become birefringent thereby changing the state of polarization of incident light. As a result, the transmission of light through the analyzer varies as a function of the strength of a transverse component of the electric field in the light valve. Therefore, by varying the applied voltage, the intensity of light can be modulated. For an example of such a light valve array having coplanar electrodes, see commonly assigned U.S. Pat. No. 4,229,095 to Mir. A difficulty with a light valve array having coplanar electrodes is that a voltage signal applied across coplanar electrodes of a gate is inefficient in producing components of electric field perpendicular to the incident light throughout the volume of the gate. Consequently, relatively high applied voltages are required to operate such light valve array gates.

In another approach, U.S. Pat. No. 3,873,187 to Brooks discloses a linear array provided with transversely driven electro-optic gates. FIG. 1 depicts such an arrangement wherein a light valve array 10 has spaced electro-optic gates 12. Metallized addressable electrodes 14 are provided on opposite parallel surfaces of each gate. Except for the end gates of the linear array, each gate electrode 14 is electrically connected to another electrode of an adjacent gate. Plane polarized light is shown to be incident upon surface 12a and passes through a gate 12.

Each gate 12 is a rectangular, parallelepiped of electro-optically active material, mounted in line (linear) on a substrate 16. When a voltage is applied across gate electrodes, an electric field is established transversely across the distance t of the gate 12 generally perpendicular to the direction of propagation of light through the gate. The input light is propagated along an axis shown by line 15. This axis is perpendicular to the established electric field and to the receiving surface 12a. Light which was initially plane polarized at a 45° angle (shown as line 17) to the direction of the field E—E in the electro-optic material travels a distance L through a gate 12. Since the electric field produced in a gate is uniform throughout the gate's volume, a gate can be operated at a relatively low voltage. In making such light valves, however, difficulty is encountered in forming and filling the grooves with metal for the electrodes 14 especially if the spacing between gates in the array is small. Another problem with the manufacture of FIG. 1 light valve arrays is that of making electrical contact with the electrodes of each gate. As shown in FIG. 3 of the above-described Brooks patent, a fine wire is strung through the grooves defining each gate prior to filling the grooves with a conductive metal material. The wires are then bonded to a circuit on which the electro-optic material is mounted. The stringing (of fine wire), the filling, and the bonding steps are time consuming. Light valve arrays produced by this method also may not be reliable.

A further problem with the transversely light valve array shown in FIG. 1 is that each gate electrode is shared by two adjacent gates. As a result, the scheme for addressing the light valve array is relatively complicated since each gate's electrodes are not discretely addressable. If the gates are operated in exclusive-or fashion, it is difficult to implement pulse width modulation techniques since each time a light valve changes its state, a ripple effect is triggered changing the state of adjacent gates. Also, it is difficult to maintain the spacing between electrodes of each gate. This spacing can change from gate to gate since the design is susceptible to groove cutting errors. If a gate has a different dimension t, the established electric field in such gate will vary from some desired value.

SUMMARY OF THE INVENTION

The object of this invention is to provide a linear light valve array having transversely driven electro-optic gates which overcome the above-discussed problems of the prior art.

This object is achieved by a linear light valve array having transversely driven, discretely addressable, electro-optic gates for selectively changing the polarization of incident polarized light. The array includes a plurality of spaced gates formed of an electro-optic material. Each gate includes a planar light receiving top surface for receiving incident polarized light, first and second spaced parallel electrode receiving surfaces that are arranged substantially normal to the top surface, and first and second discretely addressable electrodes formed on such first and second surfaces. These electrodes are arranged to be responsive to a voltage applied across them for establishing a transverse electric field that changes the plane of polarization of incident light incident on the top surface and which passes through the gate.

In accordance with the method of making such a linear light valve array, a strip of photoresist material is formed on a wafer of electro-optic material. Grooves are then cut in the wafer on each side of the strip. A conductive layer is formed on the top surface of the wafer, in the grooves and on the strip. The photoresist strip and its overlying conductive layer are then removed. Finally, a plurality of evenly spaced parallel grooves are cut in the wafer to define the gates.

DESCRIPTION OF THE PREFERRED EMBODIMENT

Figure 1:
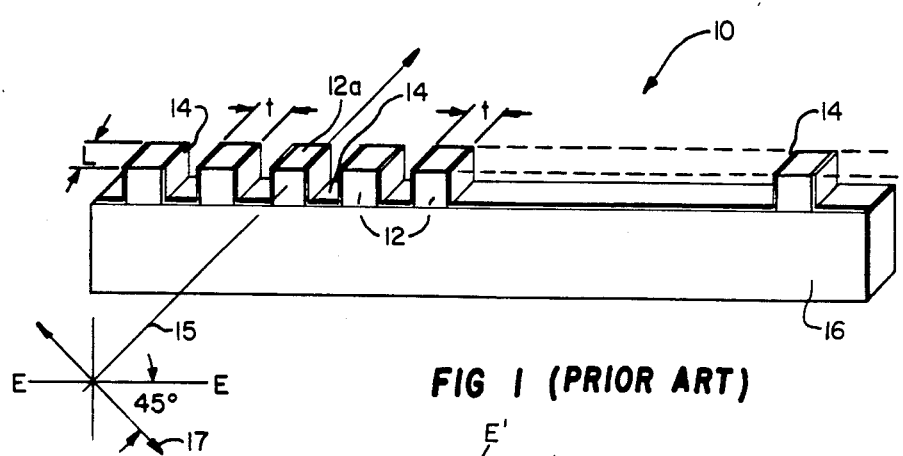
FIG. 1 is a schematic perspective view of a prior art light valve array.
Figure 2:
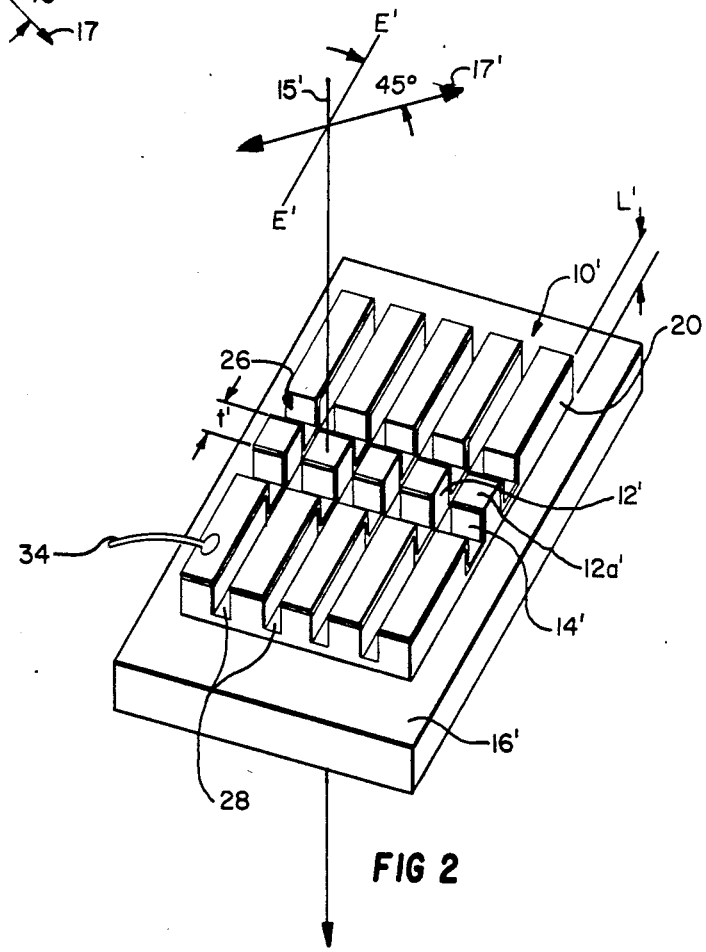
FIG. 2 is a schematic perspective view of a preferred embodiment of light valve array that can be made in accordance with the invention.

FIG. 2 shows a transversely driven linear light valve array 10' in accordance with the invention. The array 10' has a plurality of electro-optic gates 12'. Conductive addressable electrodes 14' are provided on first and second opposite parallel electrode receiving surfaces of each gate 12'. The gates 12' are mounted on an optically isotropic substrate 16'. The first electrode receiving surface of each gate lies in a first plane and the second electrode receiving surface of each gate lies in a second plane parallel to the first plane. As will be explained, this arrangement facilitates electrical connection to the electrodes 14' which are formed on the first and second gate receiving surfaces.

Each gate 12' is a rectangular, parallelepiped of electro-optically active material. When a voltage is applied across the electrodes 14' of each gate, an electric field E'—E' is established transversely across a distance t' of the gate generally perpendicular to the direction of propagation of light through the gate. The input light is propagated along an axis shown by line 15'. This axis is perpendicular to the field E'—E' and to a receiving surface 12a'. Polarized light passes through a gate 12' and the bulk of the substrate 16'. The substrate 16' is optically isotropic and does not change the polarization of the light. Light which was initially plane polarized at a 45° angle (see line 17') to the direction of the electric field in the electro-optic material by a polarizer (not shown) travels a distance L' through a gate 12'.

A conventional analyzer (not shown) receives the light from the substrate. Plane polarized light can be resolved into two components, a component, perpendicular to the direction of the applied field and a component parallel to the direction of the applied field. The electrodes 14' of each gate are discretely addressable. Since the analyzer is crossed with respect to a polarizer (not shown), when no electric field is established by the electrodes 14' of a gate, a minimum amount of light is transmitted through the analyzer. However, if an electric field is established, the state of polarization of the light passing through a gate 12' is changed. If the half-wave voltage is applied, the plane of polarization is rotated 90°, and the maximum amount of light is transmitted through the analyzer. For such a transversely driven gate 12', the voltage which causes the maximum light transmission is termed the half-wave voltage. This voltage decreases as the aspect ratio L'/t' increases (in a linear or non-linear way, depending upon the electro-optic material).

Values of L' and t' can be selected so that substantial voltage reductions may be achieved. Also values of L' and t' may be selected such that the half-wave voltage is compatible with low cost integrated circuit driver technology. The voltage of maximum transmission has been termed the "half-wave voltage" because the relative retardation of polarization components parallel and perpendicular to the applied electric field at this voltage is 180° or λ/2 for the transmitted light wave length, causing a 90° rotation in the plane of polarization of the light by a gate 12'. The term λ refers to the wavelength of the light.

The following is a description of the preferred method of making the light valve array 10'. Other important aspects of the array 10' also will be discussed with reference to this method.

Figure 3:
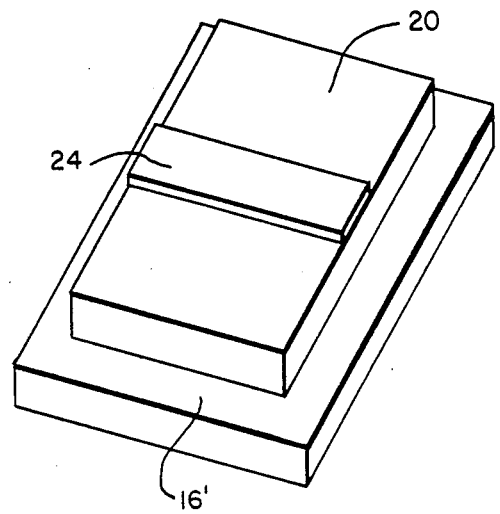
FIGS. 3-6 show several stages in the method of making the array of FIG. 2.

As shown in FIG. 3, an electro-optic (e.g. PLZT) wafer 20 is provided which has been polished or ground flat on each of its major surfaces. One of such surfaces is joined with an adhesive to the top surface of an optically isotropic substrate 16'. The adhesive should be selected so that when it sets, it should not stress the wafer or the substrate. The adhesive should be transparent and non-light scattering. Both major surfaces of the substrate 16' are also ground flat. The substrate 16' which may, for example, be made of plate glass, pyrex or fused quartz. These materials are transparent and optically isotropic. These materials also provide a stable support for use during fabrication of the light valve array 10'.

A thin strip of photoresist material 24 is formed on the wafer 20 by standard photolithographic techniques. The width of the strip 24 is the dimension t'. This dimension can be approximately 100 microns.

Figure 4:
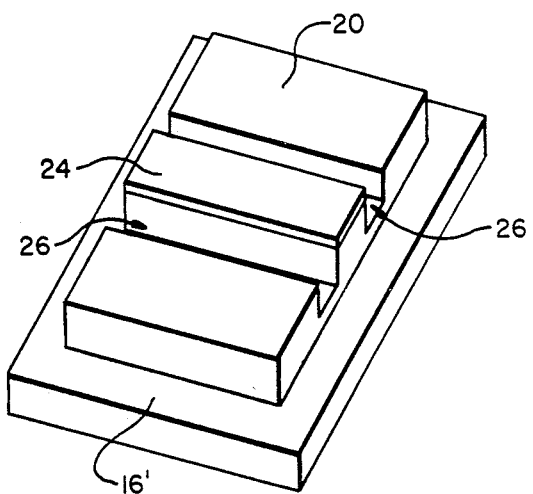

Parallel grooves or slots 26 are then cut in the wafer 20 in the pattern shown in FIG. 4. These grooves are on both sides of the photoresist strip 24. The strip 24 overlies the top surfaces 12a' of the gates of the light valve array 10'. Grooves 26 may be formed by milling and may be made quite wide. Wide grooves are advantageous since their metallization is much easier especially in vacuum systems.

Figure 5:
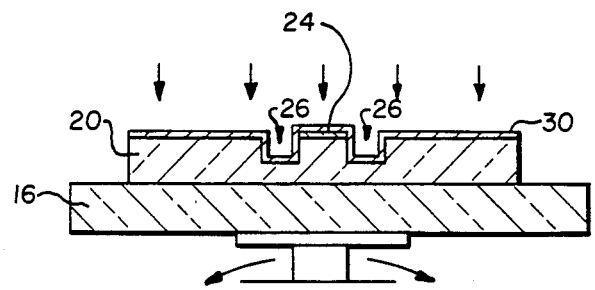
Figure 6:
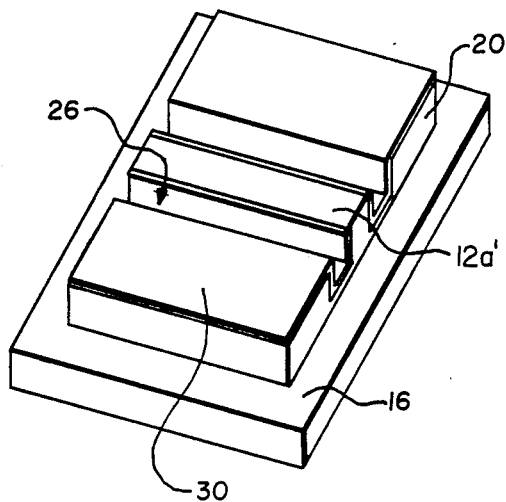

Turning now to FIG. 5, a thin, bondable film conducting layer 30 such as gold may be deposited using vacuum techniques. The layer 30 is deposited on the top surface of the wafer 20, in the grooves 26 and on the top surface of the strip 24 while the substrate 16 is rotated in a planar fashion as shown by the arrows. The metallized side surface of the wafer 20 in the grooves 26 will provide the discretely addressable electrodes 14' (see FIG. 2). As shown in FIG. 6, the photoresist strip 24 and the metal layer 30 which overlie it are removed by a standard photolithographic technique. The top surface 12a' is exposed. In the final step to form the array 10' shown in FIG. 2, grooves 28 are cut in the wafer in a pattern to define the gates. The grooves 28 are evenly spaced parallel grooves which are perpendicular to the grooves 26. Grooves 28 are cut deeper than grooves 26 in order to properly isolate the individual gates. Therefore, grooves 28 not only define the gates 12' but also electrically isolate each gate 12' from the other gates and eliminate cross talk between electrodes 14' due to fringing fields from adjacent electrodes. The dielectric constant of the electro-optic material is typically much higher than that of air. In FIG. 2, the electrical connection to an electrode 14' by a lead 34 can readily be accomplished by conventional wire bonding techniques or other standard interconnecting schemes (e.g. those used in liquid crystal technology).

The depicted arrangement uses a substrate. However, if the grooves 26 and 28 are shallow cut, an array may not need to be cemented onto an optically isotropic substrate. The substrate is used only for mechanical support. Therefore, in certain instances if the grooves are shallow compared to the wafer thickness, a substrate may not be necessary.

Figure 7:
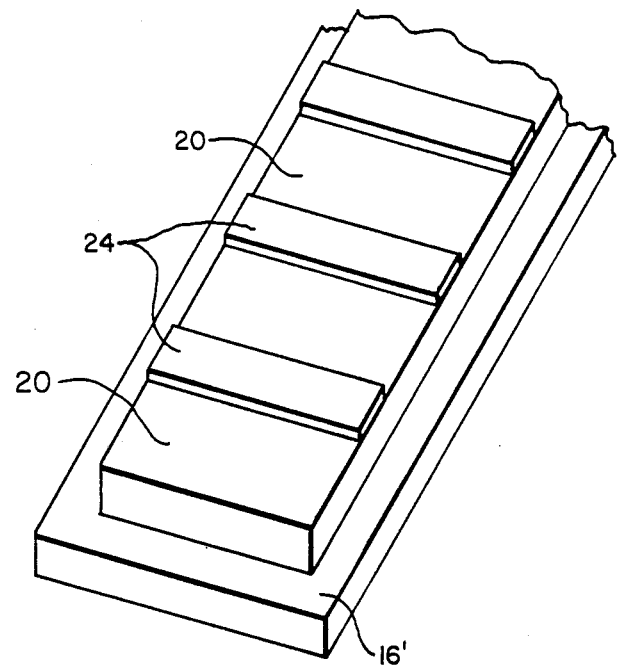
FIGS. 7 and 8 show how the method depicted in FIGS. 3-6 can be modified to make a plurality of light valve arrays.
Figure 8:
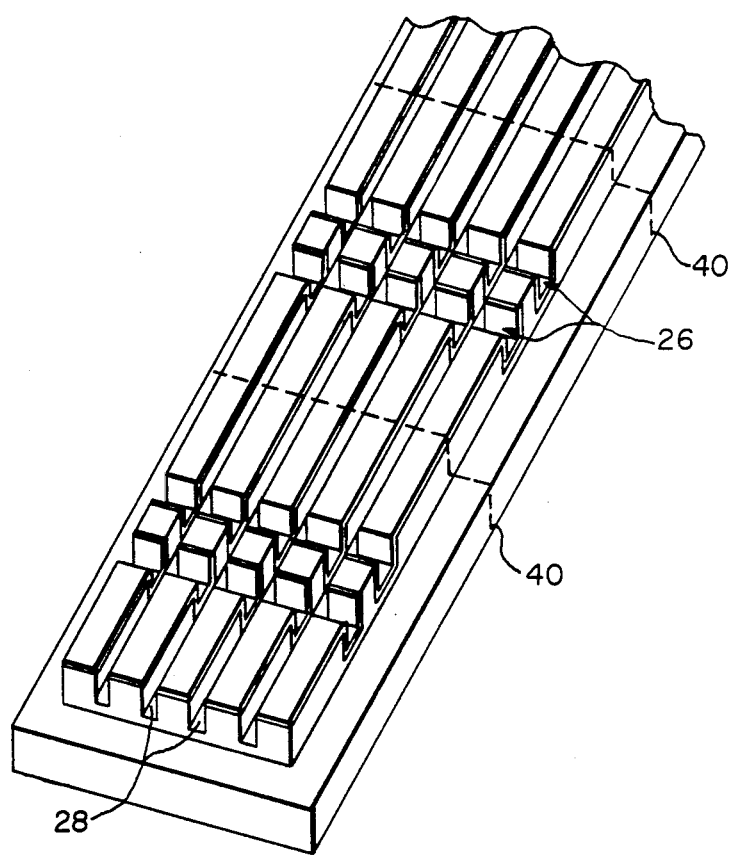

The method of making an array 10' can be modified to produce a plurality of arrays 10' from a single wafer 20. This is shown in FIGS. 7 and 8. In FIG. 7, a wafer 20 is attached to a substrate 16'. A plurality of spaced photoresist strips 24 are also formed on the wafer. The steps that describe the above are now employed. Grooves 26 are formed for each strip. Conductive layer 30 is formed on the top surfaces of the wafer, in the grooves and on the strips 24 and then the conductive layer is lifted off with the strip 24. Grooves 28 are then provided to define gates 12'. Finally, individual arrays are formed by sawing along the dashed lines 40 shown in FIG. 8.

Among the advantages of this invention are the following: standard photolithographic methods can be used to form the strip 24. After the photoresist strip 24 has been lifted off the wafer 20, no further action or polishing steps are needed for the surface 12a'. The gate electrodes 14' can be connected to potential sources by wire bonds that use flat metal contacts such as shown in FIG. 2. This is easily accomplished since the first and second electrode receiving surfaces of the gates 12' lie in common planes. One of the electrodes 14' of each gate is connected to a source of reference potential, for example ground, and the other electrode 14' is selectively coupled to a source of potential. Variations in the dimensions L' and t' from gate-to-gate can be minimized because of this arrangement. There are only two major groove cutting operations (for forming grooves 26 and 28). This minimizes variations in the dimensions L' and t' from gate-to-gate.

Metallization into the wide grooves 26 is a major advantage of this method. This can be carried out using conventional metallization equipment such as sputtering and evaporation equipment. Exellent coverage of the side walls is achieved due to the large aspect ratio of grooves 26. The exclusive-or type circuitry needed in certain prior art devices is not necessary in the present invention.

The invention has been described in detail with particular reference to a preferred embodiment thereof, but it will be understood that variations and modifications can be effected within the spirit and scope of the invention.

I claim:

1. A light valve array member having discretely addressable electro-optic gates for selectively changing the polarization of light passing therethrough, said member comprising:
    (a) a wafer of electro-optic material having opposing major surfaces which are substantially flat and parallel at a modulation zone, said wafer having a pair of spaced parallel grooves of uniform depth and width which extend into said wafer's thickness from portions of one major surface of wafer so as to form therebetween, at said modulation zone, a light modulation portion having opposing, parallel side walls respectively within the depths of said grooves;
    (b) a plurality of discrete addressing electrode strips on said wafer, said addressing electrode strips extending in spaced relation over the walls and bottom surface of a first of said grooves and across a major surface portion of said wafer that is separated from said modulation portion by said first groove, to electrical address connection locations on said wafer;
    (c) reference electrode means deposited on said wafer and extending over the walls and bottom surface of the second of said grooves and across a major surface portion of said wafer that is separated from said modulation portion by said second groove, to an electrical reference connection location(s) on said wafer; and
    (d) a plurality of uniformly spaced, parallel modulator grooves extending, perpendicular to said first and second grooves, through said modulator portion of said wafer and across said first groove and its adjacent major wafer surface portion to define said addressing electrode strips.

2. A linear light valve array member having transversely driven, discretely addressable, electro-optic gates for selectively changing the polarization of incident polarized light, said array member comprising a planar wafer of electro-optic material, said wafer having two sets of mutually perpendicular grooves formed therein which collectively define a linear array of spaced, parallelepipeds of electro-optic material, and first and second electrode means disposed respectively on first and second opposed walls of each of said parallelepipeds, said walls being those which extend both perpendicular to the plane of the wafer, and parallel to the direction of said linear array of parallelepipeds, said electrode means and the electro-optic material therebetween defining a plurality of discretely addressable electro-optic gates.

3. A method of making a linear light valve array having a plurality of transversely driven, discretely addressable, electro-optic gates, comprising the steps of:
    a. forming a photoresist strip on a wafer of electro-optic material;
    b. cutting grooves in the wafer on each side of the strip;
    c. forming a conductive layer in the grooves;
    d. removing the photoresist strip; and
    e. cutting a plurality of spaced grooves in the wafer to define the gates.

4. A method of making a linear light valve array having a plurality of transversely driven, discretely addressable, electro-optic gates, comprising the steps of:
    a. forming a photoresist strip on a wafer of electro-optic material;
    b. cutting grooves in the wafer on each side of the strip;
    c. forming a conductive layer on the top surface of the wafer, in the grooves, and on the strip;
    d. removing the photoresist strip and its overlying conductive layer; and
    e. cutting a plurality of evenly spaced parallel grooves in the wafer to define the gates.

5. A method of making a plurality of linear light valve arrays, each such array having an optically isotropic substrate and a plurality of transversely driven, discretely addressable, electro-optic gates, comprising the steps of:
    a. attaching a wafer of electro-optic material to an optically isotropic substrate;
    b. forming a plurality of spaced photoresist strips on the wafer;
    c. cutting grooves in the wafer on each side of each strip;
    d. forming a conductive layer on the top surface of the wafer, in the grooves, and on the strip;

e. removing each photoresist strip and its overlying conductive layer;

f. cutting a plurality of evenly spaced parallel grooves in the wafer to define the gates for individual arrays; and g. separating the electro-optic gate arrays into individual arrays.

* * * * *